United States Patent [19]
Yamada

[11] Patent Number: 5,356,066
[45] Date of Patent: Oct. 18, 1994

[54] AUTOMATIC SOLDERING APPARATUS

[75] Inventor: Osamu Yamada, Tokyo, Japan, JPX

[73] Assignee: Eightech Tectron Co., Ltd., Tokyo, Japan

[21] Appl. No.: 93,683

[22] Filed: Jul. 20, 1993

[30] Foreign Application Priority Data

Jul. 22, 1992 [JP] Japan .................................. 4-217165

[51] Int. Cl.$^5$ ........................ B23K 1/008; B23K 37/00
[52] U.S. Cl. ........................................... 228/8; 228/42
[58] Field of Search ............................ 228/42, 219, 8

[56] References Cited

U.S. PATENT DOCUMENTS

| | | | |
|---|---|---|---|
| 4,696,226 | 9/1987 | Witmer | 98/36 |
| 5,090,651 | 2/1992 | Mittag | 228/42 |
| 5,125,556 | 6/1992 | Deambrosio | 228/42 |
| 5,203,489 | 4/1993 | Gileta et al. | 228/42 |

Primary Examiner—P. Austin Bradley
Assistant Examiner—Jeffrey T. Knapp
Attorney, Agent, or Firm—Finnegan, Henderson, Farabow, Garrett & Dunner

[57] ABSTRACT

An automatic soldering apparatus for soldering a printed circuit board having a plurality of electronic parts mounted thereon to be soldered while it is transported through a heating chamber having an inert gas fill therein is provided. The apparatus has a first station provided with a first opening for receiving the printed circuit board into the heating chamber and a second station provided with a second opening for removing the soldered printed circuit board from the heating chamber. Further, the apparatus has a supply of an inert gas and nozzles provided in the first and second stations. The inert gas is jetted through the nozzles toward the first and second openings, when required, so as to prevent outside air from flowing into the heating chamber.

2 Claims, 2 Drawing Sheets

AUTOMATIC SOLDERING APPARATUS

BACKGROUND OF THE INVENTION

The invention relates to an automatic soldering apparatus, and, more particularly, relates to a device of the apparatus for preventing the outside air from flowing into the heating chamber of the soldering apparatus by counter flow of a small amount of an inert gas within the apparatus toward the outside air which may be abruptly caused to flow into the apparatus by change of outside conditions, thereby to maintain a constant density of the inert gas within the soldering apparatus. Thus the invention is intended to provide an extremely highly reliable automatic soldering apparatus.

Automatic soldering apparatus has been used to solder printed circuit boards with a molten solder at high temperature in air containing much oxygen. Such soldering apparatus suffers from defects and disadvantages in that molten solder and the soldered parts of printed circuit boards become oxidized and inhibit effective soldering of the printed circuit boards because of exposure of the highly heated solder and printed circuit boards to the oxygen in the air. It is therefore necessary to take subsequent laborious steps to remove the residues of solder from the soldered printed circuit boards.

Recently, the electronic parts to be mounted on printed circuit boards have been considerably smaller, and accordingly, the leads of the parts have been thinner. Therefore, even the slightest oxidization of soldered parts will cause reduced reliability of the electric products incorporating the soldered printed circuit boards.

In order to eliminate such defects and disadvantages, an automatic soldering apparatus has been provided in which an inert gas is filled to exclude oxygen from the inner part of the soldering apparatus and prevent oxidation of the highly heated molten solder and soldered parts of the printed circuit boards during the soldering operation.

In this case, the nitrogen gas used as the inert gas is expensive, and therefore the soldering apparatus is so designed as to enhance the air-tightness of the gas containment to reduce leakage of the inert gas.

However, the automatic soldering apparatus must be provided with an entrance or opening for receiving the printed circuit board to be soldered and an exit or opening for discharging the soldered printed circuit board. It has therefore been impossible to prevent the inert gas from leaking out through the entrance and the exit. Actually, it is admitted that a substantial amount of inert gas will leak out, thereby increasing costs.

Automatic soldering apparatus is controlled such that the inside temperature is progressively increased from a preheating chamber toward a reflow soldering chamber. For example, it is common for an automatic reflow soldering apparatus to have chambers of higher temperatures where the gas density is low and chambers of lower temperatures where the gas density is higher, and that the inert gas will flow toward the place of the low gas density from the place of the higher gas density.

In this case, the inert gas will flow out of the exit of the apparatus due to the difference of temperatures. This is a wasteful consumption of the expensive inert gas.

Further in this case, the flow of inert gas through the exit of the soldering apparatus will cause outside air to flow into the soldering apparatus at the entrance thereof resulting in reduction of the inert gas density in the preheating chamber. This will lower the oxidization preventing effect.

Further, automatic reflow soldering apparatus typically has a fan provided in each of the preheating and reflow soldering chambers for circulating the heated inert gas therein to melt the solder. Actually, the heated inert gas is circulated and is blown against the upper surface of the printed circuit board to preheat and additionally heat the printed circuit board so as to solder the same. The heated inert gas blown against the upper surface of the printed circuit board will separately flow in the opposite directions, that is, in the front and rear directions as the printed circuit board is transported. Such flows of inert gas will additionally increase the leakage of inert gas from the soldering apparatus.

In order to prevent the outside air from flowing into the soldering apparatus at the entrance thereof, it has been proposed to supply a much greater amount of inert gas than the amount of inert gas flowing out of the soldering apparatus at the exit thereof for the purpose of increasing a pressure within the soldering apparatus.

However such a method requires an extremely large amount of inert gas and is uneconomical.

Even in the above mentioned method, it is required to limit the supply of the inert gas to a degree such that the inert gas flowing out through the entrance of the soldering apparatus will be kept to a minimum. This method is not able to account for a sudden change of the environment outside of the apparatus. For example, if a wind blows, outside air will flow into the soldering apparatus at the entrance thereof.

The present invention has been provided to eliminate the defects and disadvantages of the prior art. It is therefore a primary object of the invention to provide an inert gas jetting nozzle or nozzles at each opening, that is, in the printed circuit board receiving station and in the printed circuit board discharge station of the automatic soldering apparatus, the nozzle or nozzles being directed to the entrance and the exit respectively. The inert gas jetted from the nozzle or nozzles will prevent the outside air from flowing into the soldering apparatus at the entrance and the exit thereof and thereby maintain the inert gas density at a desired constant level in the gas chambers of the soldering apparatus. Thus the invention is intended to prevent the oxidization of the molten solder and of the soldered parts of the printed circuit board, and at least to eliminate the diverse of soldering effects.

It is another object of the invention to provide a sensor in each of the entrance and the exit for detecting the velocity and direction of outside air flowing through the entrance and the exit to cause the inert gas to be jetted from each of the nozzles, the consumption of the jetted inert gas being limited to a minimum needed to shut off the outside air from the entrance and the exit. Thus the invention is intended to instantly cope with an abrupt change of the outside environments.

SUMMARY OF THE INVENTION

In short, the present invention relates to an automatic soldering apparatus for soldering a printed circuit board having a plurality of electronic parts mounted thereon while transporting the printed circuit board through a heating chamber filled with an inert gas, the apparatus comprising means for supplying the inert gas, a first station for receiving the printed circuit board to be soldered, a second station for removing the soldered printed circuit board from the heating chamber and nozzle means provided in each of the first and second stations and operatively connected to the inert gas supplying means to jet the inert gas in the first and second stations respectively when the inert gas is supplied to the nozzle means.

Another aspect of the invention relates to an automatic soldering apparatus for soldering a printed circuit board having a plurality of electronic parts mounted thereon while transporting the printed circuit board through a heating chamber having an inert gas fill, the apparatus comprising means for supplying the inert gas, a first station having an entrance or opening for receiving the printed circuit board to be soldered, a second station having an exit or opening for removing the soldered printed circuit board from the heating chamber, and nozzle means provided in each of the first and second stations and operatively connected to the inert gas supplying means to jet the inert gas toward the entrance and the exit respectively when the inert gas is supplied to the nozzle means.

Another aspect of the invention relates to an automatic soldering apparatus for soldering a printed circuit board having a plurality of electronic parts mounted thereon while transporting the printed circuit board through a heating chamber filled with an inert gas, the apparatus comprising means for supplying the inert gas, a first station for receiving the printed circuit board to be soldered, a second station for removing the soldered printed circuit board from the heating chamber, nozzle means provided in each of the first and second stations and operatively connected to the inert gas supplying means to jet the inert gas in the first and second stations when the inert gas is supplied to the nozzle means and sensor means provided in each of the first and second stations to detect the air flowing through the first and second stations respectively.

Still another aspect of the invention relates to an automatic soldering apparatus for soldering a printed circuit board having a plurality of electronic parts mounted thereon while transporting the printed circuit board through heating chambers having an inert gas fill, the apparatus comprising means for supplying the inert gas, a first station for receiving the printed circuit board to be soldered, a second station for removing the soldered printed circuit board from the heating chamber, nozzle means provided in each of the first and second stations and operatively connected to the inert gas supplying means to jet the inert gas in the first and second stations respectively when the inert gas is supplied to the nozzle means, sensor means provided in each of the first and second stations to detect a condition of air flowing through the first and second stations respectively, and to produce signals, and control means operated in response to the signals from the sensor means to control the amount of the inert gas jetted from the nozzle means.

DETAILED DESCRIPTION OF THE INVENTION

Figure 1:
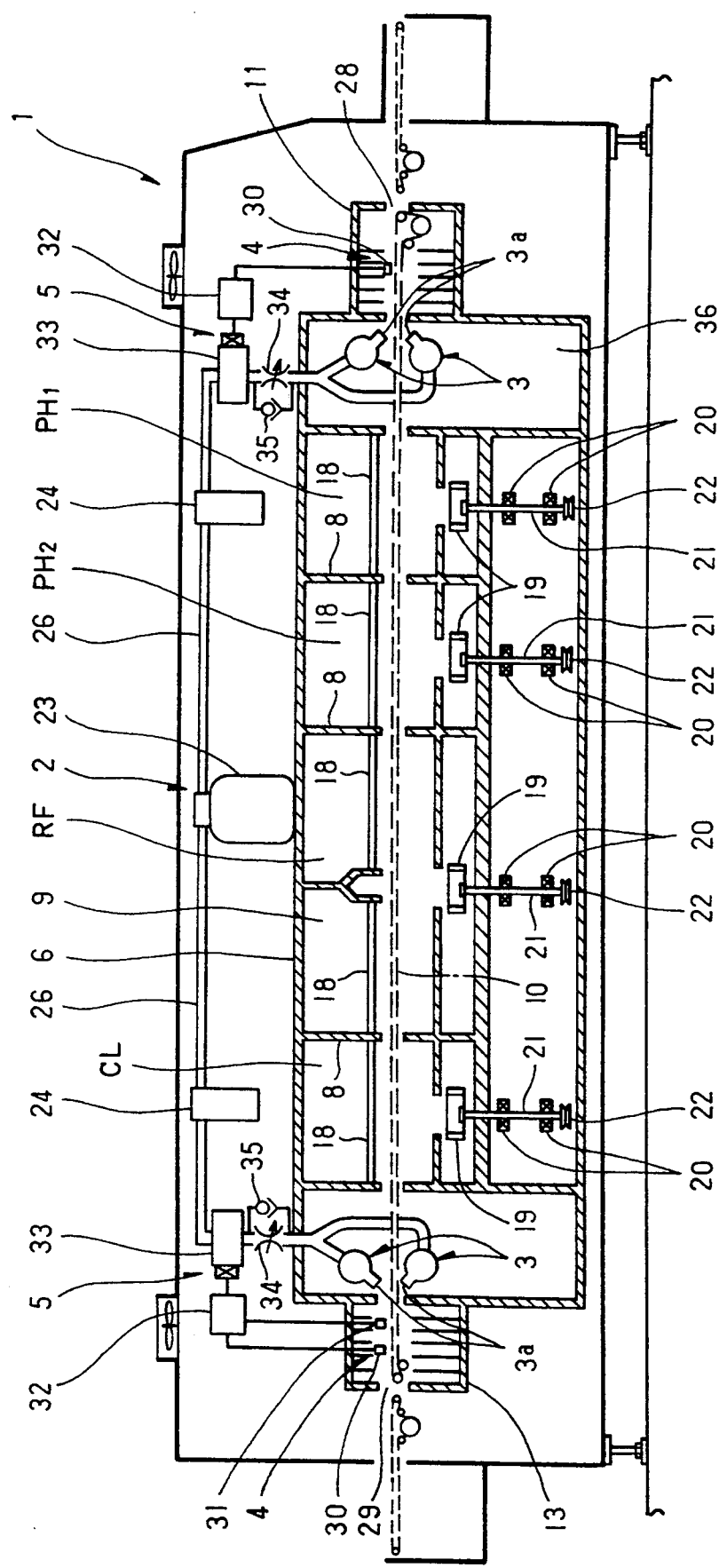
FIG. 1 is an automatic soldering apparatus of the invention shown in vertical section and FIG. 2 is an essential part of the automatic soldering apparatus shown in an enlarged scale and in vertical section.

The present invention will now be described in reference to a preferred embodiment as shown in the attached drawings.

An automatic reflow soldering apparatus 1 of the invention, by way of an example, is provided with a device 2 for supplying an inert gas, nozzles 3, sensors 4 for detecting flow of air, and control devices 5.

Figure 2:
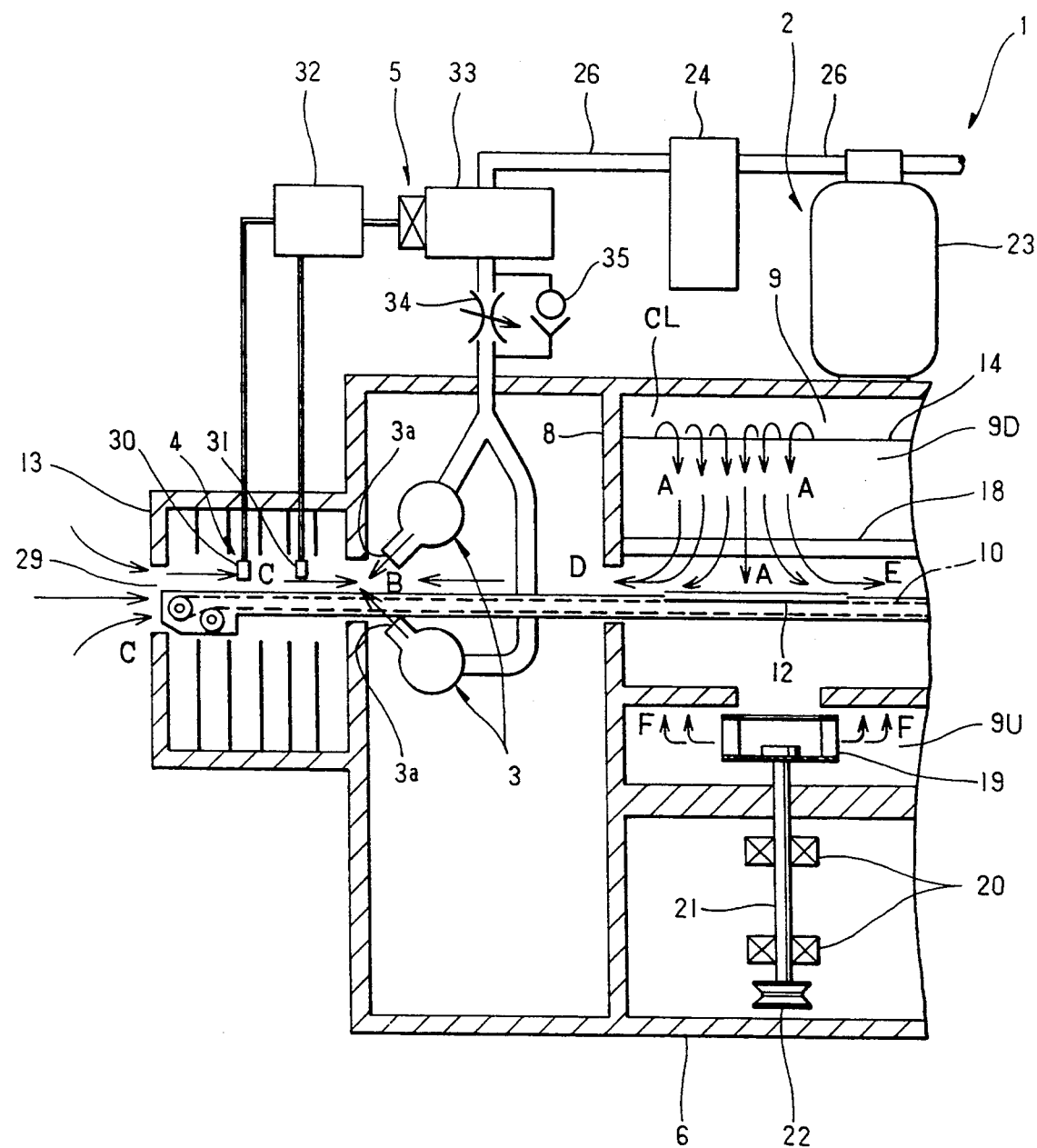

In reference to FIGS. 1 and 2, the automatic reflow soldering apparatus 1 has a basic structure composed of a casing 6 which is divided by walls 8 into preheating chambers PH1, PH2, a reflow soldering chamber RF and a cooling chamber CL, all of the chambers being formed as a heating chamber 9 in a single unit. All of the chambers are substantially of the same structure except that the temperatures are different in the respective chambers.

As a transporting device, a generally known endless chain conveyer 10, by way of an example, extends through all of the preheating chambers PH1, PH2, the reflow soldering chamber RF, and the cooling chamber CL. The chain conveyer 10 is operated to transport a printed circuit board 12, which is brought into a printed circuit board receiving station 11, through the preheating chambers PH1, PH2, the reflow soldering chamber RF, and the cooling chamber CL, sequentially, and then transport the printed circuit board out of a printed circuit board removal station 13.

A casing 14 is provided in each of the divided preheating chambers PH1, PH2, reflow soldering chamber RF and cooling chamber CL, all of which are filled with the inert gas such as a nitrogen gas. The casing 14 and an outer wall of the heating chamber 9, which corresponds to the rear side of the drawing sheet in FIG. 2, form a circulation channel 9U through which the inert gas flows up and the casing itself forms therewithin another circulation channel 9D through which the inert gas flows down.

A heating device 18, which has a heater sandwiched by a pair of perforated metal plates, is provided in each of the preheating chambers PH1, PH2, the reflow soldering chamber RF and the cooling chamber CL. More precisely, the heating device 18 is provided above the chain conveyer 10 within each casing 14 to heat the preheating chamber PH1 up to approximately 190° C., the preheating chamber PH2 up to approximately 150° C., the reflow soldering chamber RF up to approximately 250° C. and the cooling chamber CL up to approximately 70° C. Thus, heated preheating chambers PH1, PH2 are designed to preheat the printed circuit board 12 transported therethrough. The heated reflow soldering chamber RF is designed to rapidly solder the printed circuit board 12 as the latter is transported through the chamber. The cooling chamber CL is designed to progressively cool down the soldered print circuit board 12 as the latter is transported through the chamber, and then the soldered printed circuit board 12 is transported out of the soldering apparatus 1 at the removal station 13 thereof.

A fan 19 is provided below the chain conveyer 10 in each of the preheating chambers PH1, PH2, the reflow soldering chamber RF and the cooling chamber CL, to circulate the heated inert gas filled in the heating chamber 9, which is composed of the divided chambers. The fan 19 may be a centrifugal sirocco fan which has a shaft 21 supported by a ball bearing 20 and having a pulley 22 fixed thereto. The pulley is operatively connected to an electric motor by a belt (though these are not shown) so that the fan may be driven by the motor.

The fan 19 is driven to draw in the nitrogen gas filled in the heating chamber 9 while the inert gas flows down along the circulation channel 9D and through the heating device 18 as shown by arrow marks A. Thus, the heated inert gas heats the printed circuit board 12 while the latter is transported by the chain conveyer 10 in the heating chamber 9. Then the fan 19 drives the heated inert gas to flow up the circulation channel 9U, as shown by arrow marks F, so that the heated inert gas will circulate in the circulation channels 9D and 9U.

The inert gas supplying device 2 is to supply the inert gas, such as the nitrogen gas, and is substantially composed of a cylinder 23 for storing the fluid nitrogen, evaporators 24 for evaporating the fluid nitrogen and a pipe 26 for supplying the fluid nitrogen stored in the cylinder 23 to the evaporators 24 and then for supplying the evaporated nitrogen to the nozzles 3.

The nozzles 3 are provided in a station 11 which is to receive the printed circuit board 12 to be soldered into the heating chamber 9, and in the removal station 13, which is to remove the soldered printed circuit board 12 from the heating chamber 9. The nozzles 3 are designed to jet the evaporated nitrogen gas in the stations 11 and 13 respectively and/or toward an opening or entrance 28 of the station 11 and toward another opening or exit 29 of the removal station 13. More precisely, the nozzles 3 have slit nozzles of the substantially same width as that of the opposite openings 28, 29 of the heating chamber 9. As shown, one nozzle 3 is arranged above the chain conveyer 10 in each of the two opposite stations 11 and 13 and has a gas jetting opening 3a directed to the outward direction. In the same manner, another one of the nozzles 3 is arranged below the chain conveyer 10 in each of the opposite stations 11 and 13. The nozzles 3 are designed to jet the nitrogen gas toward the printed circuit receiving opening 28 and the exit 29, that is, in the direction as shown by an arrow mark B, to prevent outside air from flowing in the direction, as shown by arrow marks C, into the heating chamber 9.

The sensors 4 are provided in the printed circuit receiving station 11 and the removal station 13, respectively to detect a condition of an air flowing in the respective stations and to give signals to the control devices 5, respectively. The sensors are each composed of an air velocity sensor 30 and an air direction sensor 31.

The air velocity sensors 30 detect the velocity of the outside air flowing into the printed circuit board receiving station 11 and the removal station 13, respectively. Therefore, the air velocity sensors may be generally known rotational or flopping sensors.

The air direction sensors 31 detect the direction of the air flowing in the printed circuit board receiving station 11 and the removal station 13, respectively. The air direction sensors 31 may be of a generally known type and are used to detect whether the outer air is flowing into the stations 11 and 13 or whether the nitrogen gas is flowing out of the stations 11 and 13.

The control devices 5 are each composed of an electronic circuit 32 for conducting a PID control in response to the detecting signals from the air flow detecting sensors 4, an electric air regulator 33 for controlling the pressure of the nitrogen gas in response to a control signal from the electronic circuit 32, a valve 34 for controlling the amount of nitrogen gas flow and another valve 35 for checking the amount of the nitrogen gas flow. The valves 34, 35 provide an air pressure circuit.

The control devices 5 are designed to immediately respond to a detecting signal from the air flow sensors 4 to control the amount of the nitrogen gas which is jetted from the nozzles 3 so that the amount of the nitrogen gas will be sufficient but minimum for preventing the outside air from entering the stations 11 and 13.

The present invention is of the structure as mentioned above and the operation is as follows:

In reference to FIGS. 1 and 2, when the printed circuit board 12 is placed on the chain conveyer 10 at the printed circuit board receiving station 11, the chain conveyer 10 transports the printed circuit board 12 in the leftward direction into the preheating chamber PHI having the nitrogen gas fill therein heated to approximately 190° C. In this chamber, the electronic parts of the printed circuit board of comparatively low heat capacity will be immediately heated to the temperature of the nitrogen gas in the preheating chamber. On the other hand, the electronic parts of comparatively high heat capacity will be superficially heated to 190° C., but the interior of these electronic parts will remain at a lower temperature.

Subsequently, when the chain conveyer 10 transports the printed circuit board 12 into the preheating chamber PH2, having the nitrogen gas fill therein heated to approximately 150° C., the temperature of the electronic parts of comparatively low heat capacity will be lowered while the electronic parts of comparatively high heat capacity will be progressively heated to 150° C. Thus, all electronic parts of the printed circuit board 12 will be progressively heated to an approximately uniform 150° C. while the printed circuit board is transported through the preheating chambers PH1, PH2. The preheating operation is thus completed.

The nitrogen gas flowing down from above contacts the upper surface of the printed circuit board 12 and flows in different directions as shown by arrow marks D and E. The flowing directions actually depend upon the positional relation between the printed circuit board 12 and the fan 19 because the printed circuit board 12 changes its position as it is transported. Therefore, the nitrogen gas may variably flow from the direction shown by the arrow marks D to the direction shown by the arrow marks E or vice versa. For example, the nitrogen gas in the preheating chamber PHI will flow in the direction to a first preliminary chamber 36 and/or to the preheating chamber PH2 as the printed circuit board 12 is transported into the preheating chamber PHI.

The nitrogen gas flowing down through the chain conveyer 10 is drawn in by the fan 19, flows in the opposite directions shown by arrow marks F and then flows up along the circulation channel 9U to the heating device 18.

In the meantime, the temperature of the nitrogen gas is detected by a temperature sensor (not shown) and the detected temperature signal is transmitted to a temperature control device (not shown) which is operated to control the power supplied to the heating device 18 so that the nitrogen gas in the heating chamber 9 will be maintained at the predetermined temperature.

Subsequently, when the printed circuit board 12 is transported into the reflow soldering chamber RF having the nitrogen gas heated up to approximately 250° C., the nitrogen gas contacts the printed circuit board 12 in the same manner as in the preheating chambers PH1, PH2. Then cream solder on the printed circuit board is molten to solder the electronic parts to the printed circuit board 12.

As the heating chamber 9, which is composed of preheating chambers PHI, PH2 and reflow soldering chamber RF, is filled with the inert nitrogen gas, the chamber 9 is maintained substantially devoid of oxygen. In fact, the oxygen density is between about 100 ppm and 1000 ppm, and preferably 500 ppm. Therefore, the molten solder and the fine leads of electronic parts will not be oxidized and a most desired soldered effect is attained. The printed circuit board 12 soldered in the reflow soldering chamber RF and heated up to a high temperature is then transported into the cooling chamber CL of approximately 70° C. and progressively cooled down to a temperature below 150° C. Subsequently, the cooled printed circuit board 12 is transported out of the heating chamber 9 at the removal station 13.

Now in reference to FIG. 1, the automatic reflow soldering apparatus 1 is controlled to have temperatures progressively higher from the preheating chamber PHI to the reflow soldering chamber RF.

On the other hand, the density of the nitrogen gas is lower in the places of higher temperatures and is higher in the places of lower temperatures. Therefore, the nitrogen gas in the reflow soldering apparatus 1 will generally flow from the preheating chamber PHI of higher gas density to the reflow soldering chamber RF of lower gas density. That is, the nitrogen gas may easily flow out of the exit 29 due to the difference of temperatures.

When the heated nitrogen gas flows out of the heating chamber 9 at the printed circuit board removal station 13, the air velocity sensor 30 is operated to detect the gas flowing velocity while the air direction sensor 31 is operated to detect the gas flowing direction and then transmit detecting signals, respectively to the electronic circuit 32.

Then the electronic circuit 32 is operated to control the electric air regulator 33 to decrease the pressure of the nitrogen gas supplied by the inert gas supplying device 2 until the nitrogen gas jetted from the nozzles 3 is stopped.

When it happens that the outside air flows in the direction shown by arrow marks C into the printed circuit board removal station 13, due to outside environmental changes, for example, when a wind blows, the air velocity sensor 30 and the air direction sensor 31 are operated to detect the air velocity and the air direction respectively in the same manner as mentioned above and then transmit the detecting signals to the electronic circuit 32.

In response to the detecting signals, the electronic circuit 32 is operated to cause the electric air regulator 33 to increase the pressure of the inert gas supplied from the inert gas supplying device 2 until a required minimum amount of inert gas, which is sufficient to prevent the outer air from flowing into the printed circuit board removal station 13, is jetted from the nozzles 3 in the direction shown by the arrow marks B.

Although the invention has been described in reference to the automatic reflow soldering apparatus 1, it is apparent that the invention is not limited to this embodiment but may be applied to the other types of automatic soldering apparatuses such as the jetting soldering apparatus and/or the dipping soldering apparatus.

What is claimed is:

1. An automatic soldering apparatus for soldering a printed circuit board having a plurality of electronic parts mounted thereon to be soldered while it is transported through a heating chamber having an inert gas filled therein, the apparatus having a first station for receiving the printed circuit board to be soldered and a second station for removing the soldered printed circuit board from the heating chamber, said apparatus comprising:

nozzle means provided in the first and second stations respectively;

means for supplying the inert gas to the nozzle means for jetting the inert gas in the first and second stations; and sensor means provided in the first and second stations respectively to detect a condition of air flowing through the first and second stations and to produce detecting signals.

2. The apparats as defined in claim 1, further comprising control means operated in response to the detecting signals from the sensor means to control the amount of the inert gas jetted from the nozzle means such that the outer air is prevented from flowing into the heating chamber through the first and second openings.

* * * * *